United States Patent [19]

Marcalus et al.

[11] Patent Number: 4,458,845

[45] Date of Patent: Jul. 10, 1984

[54] PULPING APPARATUS

[76] Inventors: James A. Marcalus, 13908 Valna Dr., Whittier, Calif. 90605; Thomas S. Jordan, 1309 E. Paraiso, Pomona, Calif. 91767

[21] Appl. No.: 399,015

[22] Filed: Jul. 16, 1982

[51] Int. Cl.³ ............................................. B02C 19/12
[52] U.S. Cl. ......................................... 241/1; 241/21; 241/24; 241/74; 241/301
[58] Field of Search ............... 241/21, 24, 1, DIG. 38, 241/20, 301, 74, 60, 41, 46 R, 70

[56] References Cited

U.S. PATENT DOCUMENTS

| | | | |
|---|---|---|---|
| 2,684,206 | 7/1954 | Zettel | 241/74 X |
| 3,993,252 | 11/1976 | Ito et al. | 241/DIG. 38 X |
| 4,123,108 | 10/1978 | Lavon | 241/1 X |
| 4,124,168 | 11/1978 | Bialski et al. | 241/24 X |
| 4,154,407 | 5/1979 | Lamort | 241/DIG. 38 X |
| 4,235,707 | 11/1980 | Burke, Jr. | 241/1 X |

Primary Examiner—Mark Rosenbaum
Attorney, Agent, or Firm—Edgar W. Averill, Jr.

[57] ABSTRACT

A process for defibrilating or pulping used corrugated waste paper and all fibrous paper and pulp products. The process utilizes a soaking step wherein the corrugated waste paper is soaked. The soaked paper is conveyed to the interior of a perforated rotating drum where it is sprayed with high pressure water and broken down to fibers which may be reprocessed to make new paper and other materials.

12 Claims, 6 Drawing Figures

PULPING APPARATUS

BACKGROUND OF THE DISCLOSURE

The field of the invention is waste paper processing machinery and the invention relates more specifically to a process for making pulp from used corrugated containers and other grades of waste paper. With the increased interest in conservation of natural resources and particularly forests, there has been an increased interest in recycling waste paper and waste corrugated containers. Such waste containers provide an important resource and by the proper technique may be broken down in water to a pulp which may be used as a portion or entirely as a source of pulp for additional processing into useful paper products.

In the past, the most common method of defibrilating waste paper has been to place it in a tank of water which has an agitator blade at the bottom or at the sides of the tank. The soaking action of the water combined with the agitator action of the blade tends to break up the paper or cardboard into its original fibers which can then be removed from the tank. One such process is shown in U.S. Pat. No. 4,129,259 to Vokes. The major problem, however, with this type of process is the difficulties caused by foreign matter such as string or wire which become tangled in the impeller and must be manually or mechanically removed periodically which is both time consuming and difficult. This process also breaks up glass and other brittle materials into tiny particles which must be removed in a centrifuging or other separating process. Other machines which have been used for this purpose are shown in the following U.S. Pat. Nos: 3,941,316, 4,163,036, 1,831,642, 2,917,245, and 3,993,252. All of the above shown apparatuses suffer from various defects and most of them are inefficient users of either water or electricity or both and a more efficient process which is capable of recycling its water is needed to maximize the efficiency of this recycling process.

SUMMARY OF THE INVENTION

It is thus an object of the present invention to provide a process for defribrilating used corrugated containers and other paper fibrous materials which permits the recycling of process water and minimizes the amount of power required to operate the process.

The present invention is for a process for defribrilating used corrugated containers and other grades of waste paper. The first step is submerging the waste paper in water and holding the paper under water by an overhead paddled conveyor for a time sufficient for the paper to become saturated with water. The soaked paper is then conveyed to the interior of a rotating drum. The drum is positioned horizontally and is sufficiently open at its entry end to permit the entry of soaked paper into the inside of the drum. The drum has a waste solid exit at the other end and has a plurality of perforations passing through the side walls thereof for the passage of defibrilated matter therethrough. The soaked waste paper within the drum is sprayed with high pressure water jets directed toward the side walls of the drum to drive the resulting fibers through the perforations in the drum walls and the non-fiber waste material which does not go through the perforations in the drum wall is passed out of the other end of the drum. Preferably, a stainless mesh screen is bolted or tack welded along the inner wall of the drum and one or more spiral worm bars are affixed by bolting to the inside side wall to urge the waste solid material toward the exit end of the drum. The exit end of the drum is preferably flushed by a low pressure high volume water stream to remove any remaining fiber residue. Preferably, the water is sprayed out of a series of water jets positioned near the axis of rotation of the drum and preferably, this water is held between 50 and 100 pounds per square inch to generate sufficient force to break up the soaked paper. The exiting pulp is preferably dropped onto a side hill screen where the water may pass through the screen and be recycled, and the pulp passes over the surface of the screen into a collection trough.

DESCRIPTION OF THE PREFERRED EMBODIMENTS

Figure 1:
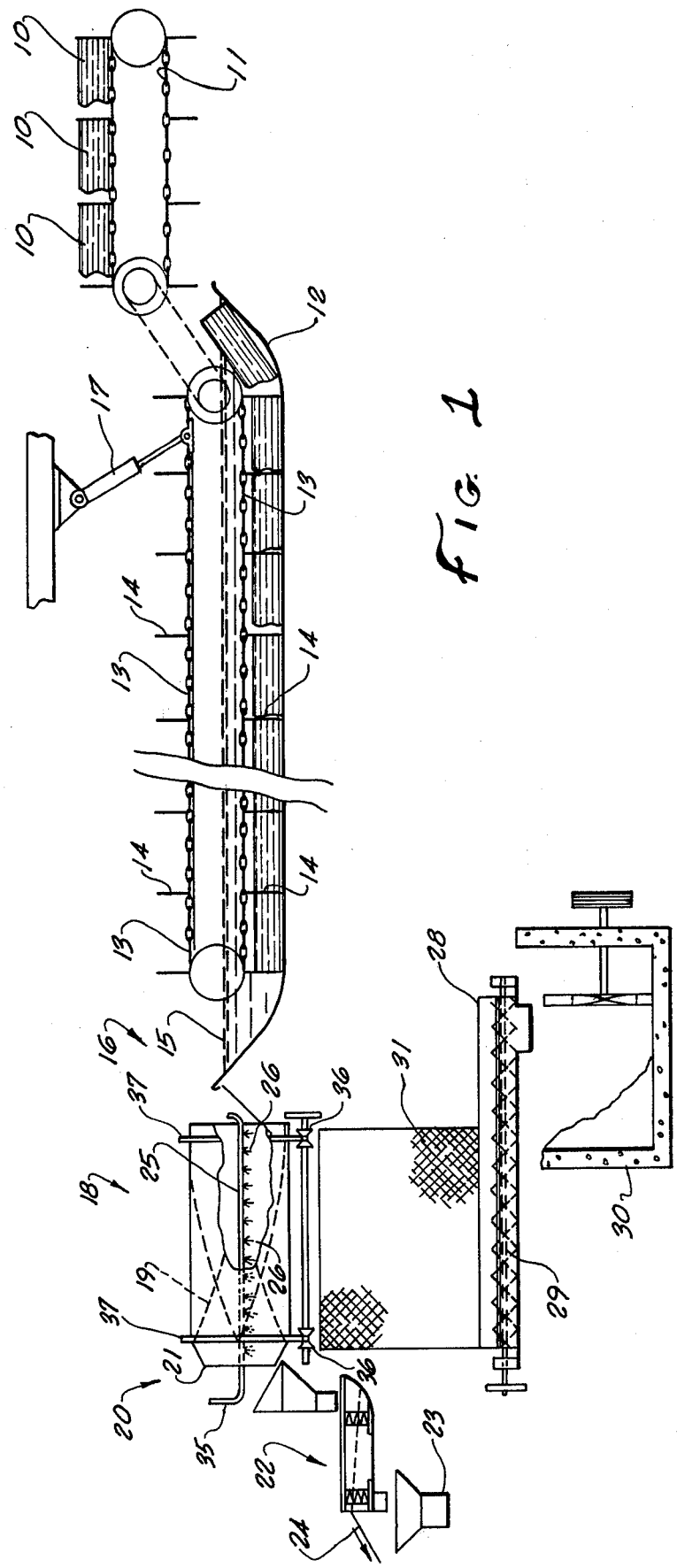
FIG. 1 is a side view of the apparatus of the present invention.

Bales 10 of old corrugated or other waste fibers are placed on a bale conveyor belt 11 and moved toward a trough 12 which is filled with water 15. A conveyor 13 is suspended above the level of water 15 and has a plurality of arms 14 which help to convey the bales under water toward the exit end 16 of trough 12. A hydraulically operated arm 17 is connected to the entrance end of conveyor 13. In the event of a jam, the conveyor may be lifted to clear the jam by the retraction of arm 17.

The paper is moved slowly along the trough under water and permitted to soak for a period of time sufficient to saturate the waste paper. Typically, this may be for a period of 30 to 90 minutes, although increased soaking time is not detrimental and complete saturation speeds up the defibrilating process in the drum which will be described below. With regard to the saturation process in trough 12, the efficiency of the soaking step may be improved by imparting a certain amount of movement to the bales as they are held under water. A bobbing motion may be imparted by any conventional means and helps assist in removing air entrapment.

Figure 6:
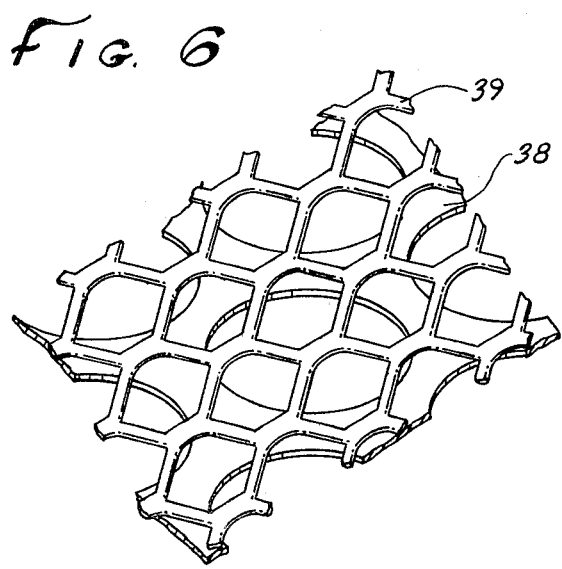
FIG. 6 is a perspective, enlarged view of the perforated drum shell and liner of the apparatus of FIG. 1.
Figure 3:
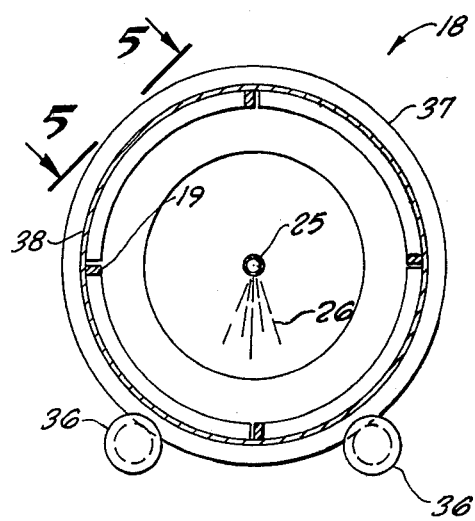
FIG. 3 is a front view of the apparatus of FIG. 1.
Figure 5:
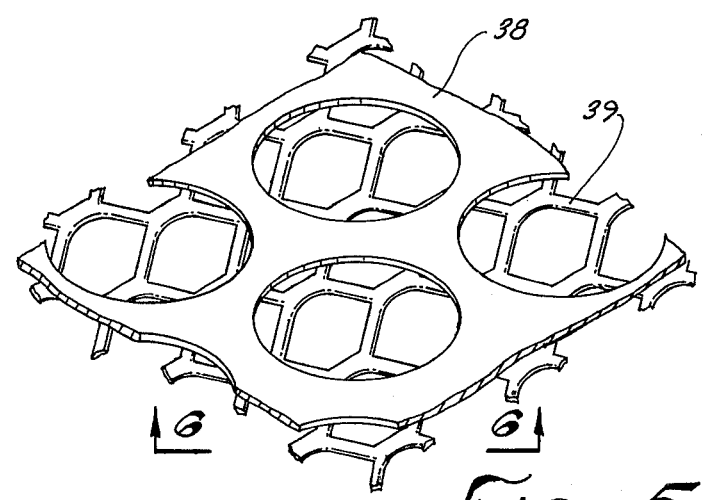
FIG. 5 is a perspective, enlarged view of the perforated drum shell and liner of the apparatus of FIG. 1.

The soaked paper leaves trough 12 and enters the interior of rotating perforated drum 18. The drum is preferably made from stainless steel or other corrosion resistent material and is open at both ends. The drum has many holes through its side wall which should be about one to one and one-half inch in diameter. On the inside surface of drum 18 is a stainless steel expanded mesh screen which preferably should have openings between one-fourth and one-half inch across. The perforated shell 38 of drum 18 together with the mesh is shown in FIGS. 5 and 6. This mesh helps to break up aggregations of fiber and prohibits oversized pieces from passing through the walls of the drum.

Figure 4:
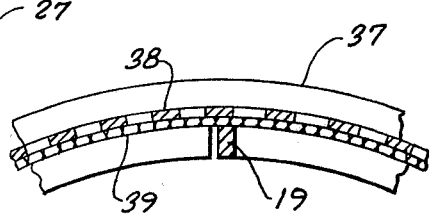
FIG. 4 is an enlarged view of a portion of the drum of the apparatus of FIG. 3.

Drum 18 rides on four grooved caster wheels which hold two chine rings 37 welded to the outer surface of drum 18. An enlarged portion of drum 18 is shown in FIG. 4 in cross section. It can be seen that drum 18 has a perforated shell 38 to which a layer of expanded metal 39 is welded or otherwise affixed.

While an expanded metal mesh is believed to be the preferable material, other types of mesh or screen could be used as long as the openings are in the general range of one-fourth to one-half inch across.

A plurality of baffles or worm bars are shown in phantom lines and indicated by reference character 19. These are welded or otherwise affixed to the interior surface of the drum and tend to work the oversized waste material toward the exit end 20 of drum 18. These spiral worm bars 19 are preferably about three to four inches in height and about ⅜ inch in thickness. The exit of drum 18 preferably has a spout 21 to assist in preventing desirable pulp from passing out of exit end 20. Preferably, there are four worm bars, although this number is not critical and as little as one or as many as six could be used. A secondary recovery system is shown beyond spout 21 where a shaker screen 22 permits pulp to pass therethrough and into a funnel 23 and back to the final fiber storage area, and the rejects pass over a ramp 24 to be thrown away.

Figure 2:
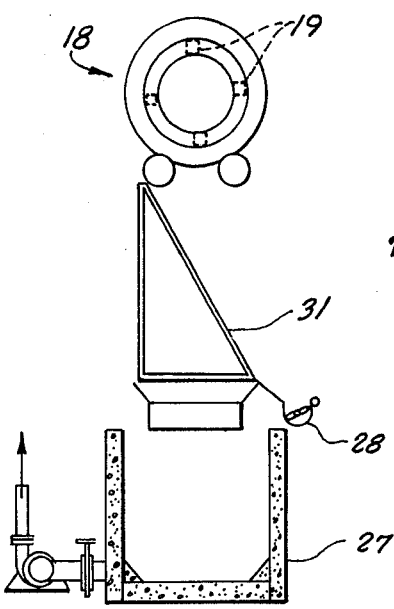
FIG. 2 is an end view of the apparatus shown in FIG. 1.

A water jet manifold 25 is positioned near the axis of rotation of drum 18 and has a plurality of jets 26. The water is introduced into the manifold at a relatively high pressure such as between 200 and 400 pounds per square inch. As the streams of water hit the soaked waste paper, the paper is broken up into its fibers and passes through the wire mesh and perforations in the side wall of drum 18. A second manifold 35 may be positioned through exit end 20, and high volume low pressure water may be used to wash additional fibers through the drum and to separate them from solid waste materials. The pulp and water falls from drum 18 as shown best in FIG. 2 onto a side hill screen 31 which is preferably a 60 to 100 mesh screen. The water falls through screen 31 and into water storage chest 27 where it can be recycled back to either the saturating tank or may be filtered and passed through the water jets 26. The solid pulp which passes over the surface of side hill screen 31 passes into a stock trough 28 and is conveyed by a worm conveyor 29 to stock storage chest 30. At this point, a conventional cleaner such as a centrifuge commonly used in such recovery processes may be used to remove sand and grit. It should be noted, however, that the practice of the present invention greatly reduces the amount of foreign material which is removed by the centrifuge. As pointed out above, most prior art processes tend to break up bottles, glass and other brittle materials whereas the process of the present invention tends to pass these out of the open exit end of the drum.

The use of the apparatus described above and shown in the drawings results in a substantial savings in both labor and energy. The amount of manual sorting required is greatly decreased because of the apparatus's ability to pass foreign material out of the exit end of the drum. Furthermore, the water used in the process may be readily recirculated. Furthermore, there is no high energy requiring step which would be similar to the underwater impeller of the Vokes process shown in U.S. Pat. No. 4,129,259. Instead, the power used to rotate the drum is of a relatively low order as is the power used to move the material being soaked along the trough. Similarly, the power required to pump the water is of a relatively low order and the net result is a highly efficient process which is both continuous and which requires very little labor to operate thus saving equipment and power for screening foreign materials.

While the drum of the present invention is referred to as a steel drum with round holes which have been covered with an expanded mesh on the interior surface, other drum configurations may likewise be used. For instance, a mesh drum might be used, but it is believed that the particular configuration shown in the drawings and described above is more efficient at ejecting solid waste from its exit end.

The present embodiments of this invention are thus to be considered in all respects as illustrative and not restrictive, the scope of the invention being indicated by the appended claims rather than by the foregoing description. All changes which come within the meaning and range of equivalency of the claims therefore are intended to be embraced therein.

What is claimed is:

1. A process for defibrilating used corrugated containers and other grades of waste paper, said process comprising the steps of:
   submerging waste paper in water and holding said paper under water for a time sufficient for the paper to become saturated with water;
   conveying the resulting soaked paper into the interior of a rotating drum, said drum being positioned horizontally and said drum being sufficiently open at its entry end to permit the entry of soaked paper into the inside of the drum and having a waste solids exit at the other end, said drum further having a plurality of perforations passing through the side walls thereof for the passage of defibrilated matter therethrough;
   impinging the soaked paper within the drum with a forceful stream of high pressure water jets directed toward the side walls of the drum to break up the paper and to drive the resulting fibers through the perforations in the drum walls; and
   removing non fiber waste material from the waste solids exit of the drum.

2. The process of claim 1 wherein the drum used in said conveying step is provided with at least one spiral worm bar affixed to the inside side wall surface of the drum with respect to the direction of its longitudinal axis whereby the waste solids are urged toward the waste solids exit when said drum is rotated.

3. The process of claim 2 wherein the drum used in said conveying step has four worm bars.

4. The process of claim 1 wherein said drum used in said conveying step has an expanded metal liner positioned against the inner surface of the wall thereof.

5. The process of claim 1 wherein said impinging step utilizes water jets held on a pipe suspended near the longitudinal axis of said drum.

6. The process of claim 1 wherein said water jets have a water pressure of between 50 and 100 pounds per square inch.

7. The process of claim 1 further including a second set of water jets positioned near the exit end of the drum for washing additional fibers through the drum and separating them from solid waste materials.

8. The process of claim 1 wherein said submerging step is carried out by a moving conveyor positioned longitudinally in a trough, said moving conveyor being held below the surface of the water in said trough and said conveyor has a plurality of bale contacting arms to move the paper along the trough as the conveyor moves.

9. The process of claim 1 further including the step of dropping the fibers which pass through the perforations in the drum onto a side hill screen having a mesh size between 60 and 100 whereby the water which is not held by the fibers falls through the screen and may be recycled and the fibers fall from the surface of the side hill screen and may be collected.

10. The process of claim 9 wherein the expanded metal liner of the drum of said conveying step has openings about three eighths inch across.

11. The process of claim 1 wherein the perforations in the side of said drum of said conveying step are about one inch in diameter.

12. The process of claim 1 wherein said submerging step lasts for about one hour duration.

* * * * *